(No Model.) 2 Sheets—Sheet 1.
C. GATES.
HAY TEDDER.
No. 368,390. Patented Aug. 16, 1887.
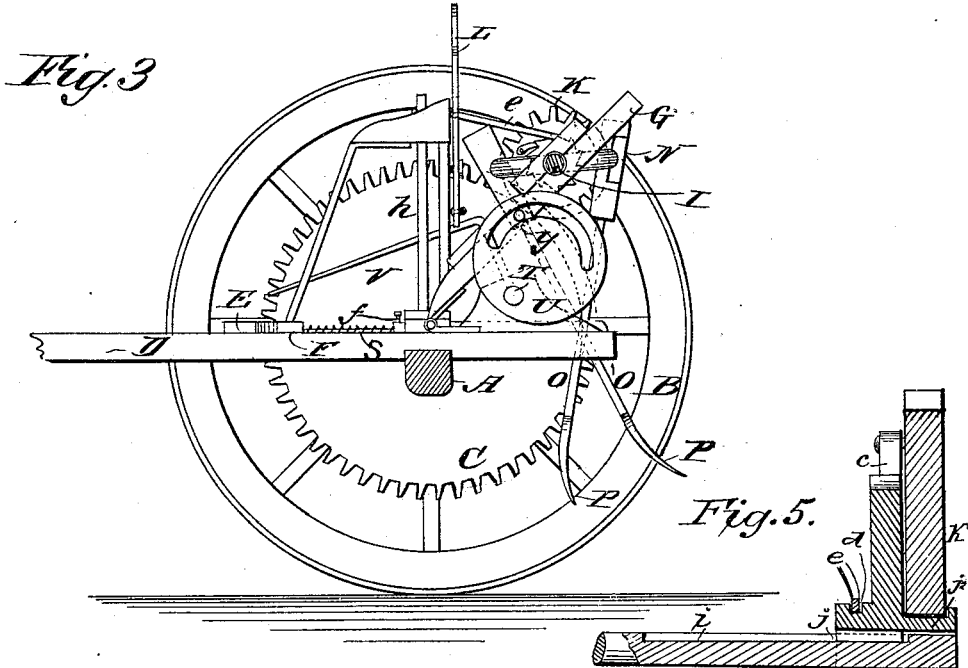
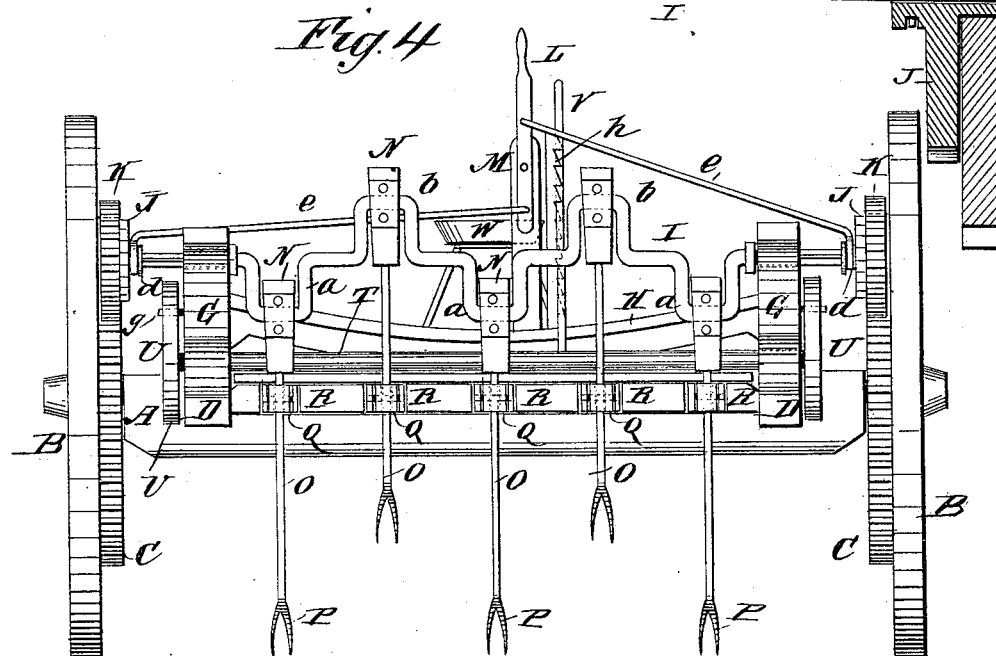
WITNESSES:
Francis McArdle
C. C. Sedgwick
INVENTOR:
C. Gates
BY Munn & Co.
ATTORNEYS.

(No Model.) 2 Sheets—Sheet 2.

C. GATES.
HAY TEDDER.

No. 368,390. Patented Aug. 16, 1887.

WITNESSES:
F. McArdle.
C. Sedgwick

INVENTOR:
C. Gates
BY Munn & Co.
ATTORNEYS.

UNITED STATES PATENT OFFICE.

CURTIS GATES, OF LYNDON, VERMONT.

HAY-TEDDER.

SPECIFICATION forming part of Letters Patent No. 368,390, dated August 16, 1887.

Application filed February 18, 1887. Serial No. 228,056. (No model.)

*To all whom it may concern:*

Be it known that I, CURTIS GATES, of Lyndon, in the county of Caledonia and State of Vermont, have invented a new and Improved Hay-Tedder, of which the following is a specification, reference being had to the annexed drawings, forming a part thereof, in which—

Figure 1:
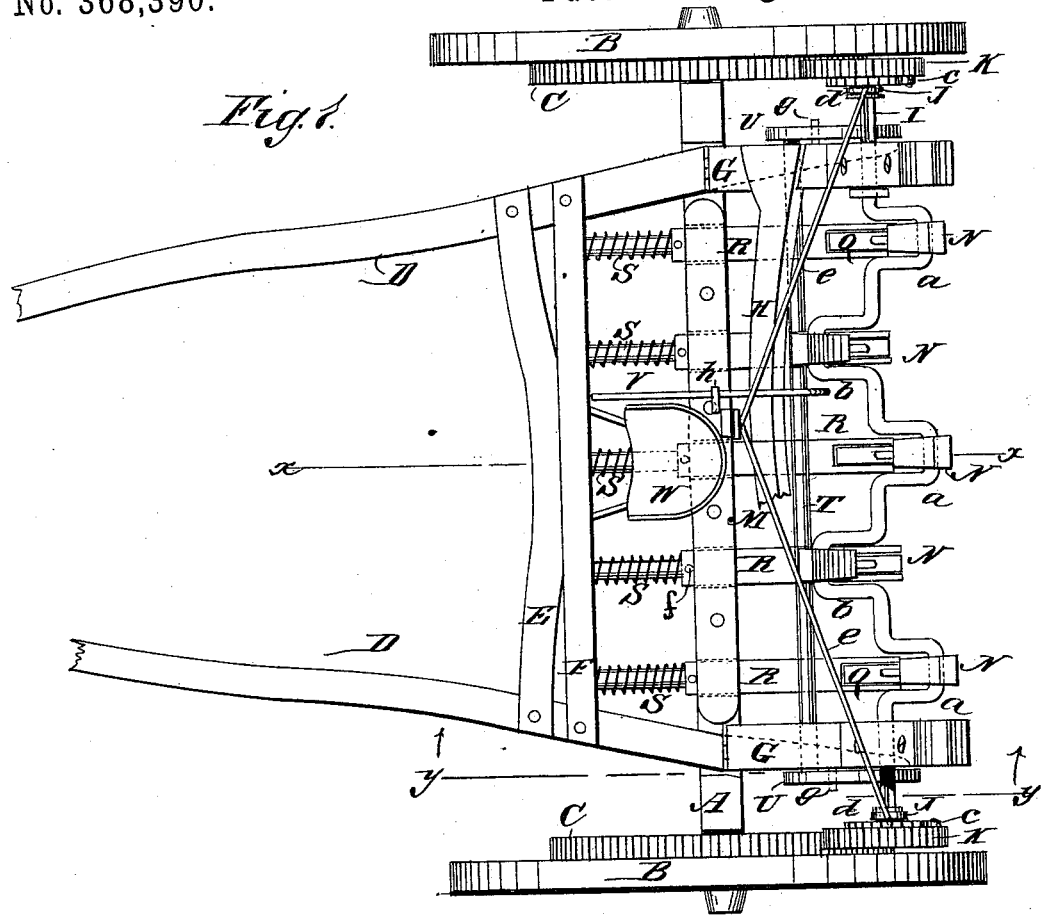
Figure 2:
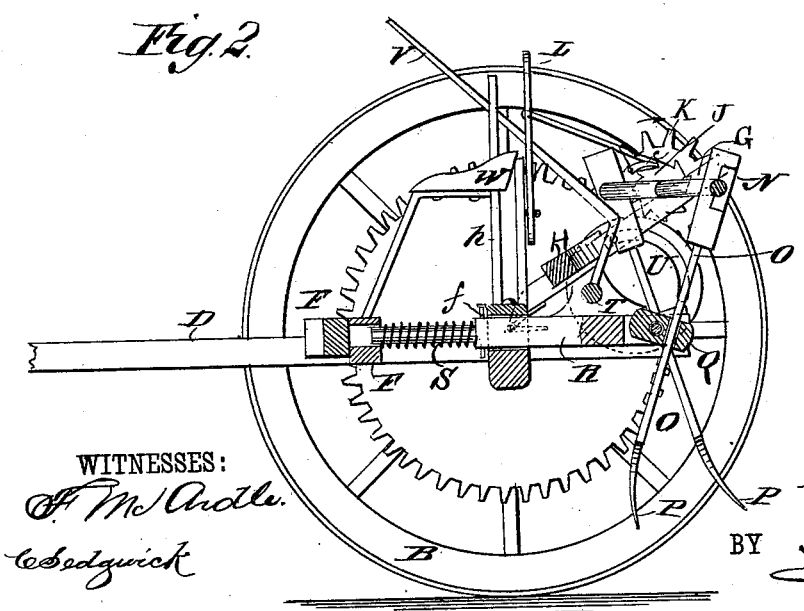

Figure 1 is a plan view of my improved hay-tedder. Fig. 2 is a transverse section taken on line $x\ x$ in Fig. 1. Fig. 3 is a transverse section taken on line $y\ y$ in Fig. 1. Fig. 4 is a rear elevation, and Fig. 5 is a detail sectional view, of a part of the crank-shaft, a ratchet-wheel, J, pinion K, and fork $d$.

Similar letters of reference indicate corresponding parts in all the views.

The object of my invention is to construct a simple and effective machine for lifting hay from the ground and throwing it into the air for the purpose of separating it, and allowing it to fall in a loose condition so that it may cure quickly.

My invention consists in a frame supported on drive-wheels and carrying a crank-shaft having series of oppositely-arranged cranks, and a series of forks connected with the cranks and arranged to slide through oscillating guides pivoted in spring-pressed supports.

It also consists in novel mechanism for regulating the height of the forks from the ground.

The axle A is supported by two similar drive-wheels, B, placed on opposite ends thereof, each drive-wheel carrying a spur-wheel, C. To the axle are secured shafts D, by which the tedder is drawn forward. The shafts are prolonged behind the axle, and are connected in front of the axle by the cross-bars E F.

To the shafts D are hinged bars G, the pintles of the hinges being in line with the axes of the wheels B. The bars G are inclined upward and rearward, and are connected with each other by a curved cross-bar, H, and in the upper halves of the bars G is journaled a crank-shaft, I, provided with cranks $a\ a\ a$ and $b\ b$, the cranks $a$ being arranged diametrically opposite the cranks $b$, and alternating with them in respect to their position in the length of the shaft.

The shaft I has grooves $i$ at opposite ends and adapted to receive feathers $j$, carried by ratchet-wheels J. On the outer part of the hub $j^2$ of the ratchet-wheels J are journaled pinions K, which mesh into the spur-wheels C. Each pinion carries a pawl, $c$, which engages the teeth of the ratchets J. The inner parts of the hubs of the ratchets are grooved circumferentially to receive forks $d$, formed on the ends of rods $e$, which extend to a point near the center of the machine, and are pivotally connected with the lever L, which is fulcrumed on a standard, M, attached to the axle A. The upper end of the lever L is provided with a handle by which the lever may be moved to slide the ratchets and pinions upon the shaft I to disengage the pinions from the spur-wheels C. The feathers carried by the ratchet-wheels J, by engagement with the slots of the shaft, allow the ratchet-wheels to be moved longitudinally on the shaft, but cause them to turn with the shaft. The engagement of the pawls $c$ with the ratchet-wheels J causes the ratchet-wheels and the shaft I to be revolved when the pinions K are turned by engagement with the spur-wheels C as the machine is drawn forward; but when the machine is pushed backward, or turned so as to cause one of the drive-wheels to revolve in the forward direction while the other revolves in the opposite direction, the ratchet-connections between the spur-pinions and the shaft allow one of the pinions to turn in a forward direction and carry the shaft I while the other pinion revolves in the opposite direction and carries its pawl around on its ratchet without in any way affecting the motion of the shaft.

Upon each crank $a\ b$ is placed a crank-box, N, which carries a rod, O, having upon its lower end a fork, P. The rod O passes through a guide, Q, pivoted in the forked end of a bar, R, which extends through slots or bearings formed in the axle and into a hole formed in the cross-bar F. The bars R are prevented from accidental rearward withdrawal by means of pins $f$, passed through them just in front of the axle. The forward end of the bar R is rounded and provided with a spring, S, one end of which abuts against a shoulder formed on the bar, while the opposite end abuts against the cross-bar F, so as to permit the forward end of the bar to slide freely back and forth in the cross-bar. Each rod O is provided with a bar like that already described, which guides the rod during the normal working of the machine, and which will yield whenever the fork P strikes an obstruction.

In journal-bearings attached to the rear ends of the shafts D is supported a rock-shaft, T, having upon opposite ends slotted cams U, which receive pins $g$, projecting from the bars G. The slots are semicircular and are formed in the cams at their points of greatest eccentricity eccentric to the rock-shaft. To the shaft T is secured a lever, V, which extends upward and forward within easy reach of the driver occupying the seat W. By turning the shaft T by means of the lever V the bars G may be raised or lowered, thus varying the height of the forks P and of the mechanism by which they are operated. At the side of the driver's seat W is arranged a standard, $h$, provided with ratchet-teeth for engaging the lever V and holding it in any desired position.

As the shaft I is operated in the manner described, the rods O are oscillated and at the same time reciprocated, bringing the forks P near the ground and into engagement with the hay, then moving them rearwardly with a rapid motion due to the near approach of the cranks to the pivotal guides of the rods. After the rearward motion of the forks P they are drawn upward disengaging them from any hay that may have become entangled with them.

Having thus fully described my invention, I claim as new and desire to secure by Letters Patent—

1. In a hay-tedder, the combination, with the frame, the crank-shaft, and the depending fork-carrying rods oscillating on said cranks, of the longitudinally-yielding bars, bearings therefor on the frame in advance of the said rods, vertically-oscillating guides pivoted to the rear ends of said bars, and the fork-carrying rods passing loosely through said guides, substantially as set forth.

2. In a hay-tedder, the combination, with the axle, the wheels, and the shafts secured to the axle and projecting at their rear ends in rear of the axle, of the hinged rearward-extending bars G, having the laterally-projecting pins $g$, the crank-shaft journaled in the free ends of said bars, the fork-carrying rods operated by said crank-shaft, the rock-shaft journaled in bearings on the said rear ends of the shaft below the hinged bars, and provided at its ends with eccentrics or cams having semicircular slots receiving said pins, and means for operating the crank-shaft, substantially as set forth.

3. In a hay-tedder, the combination, with the driving-wheels B and spur-wheels C, carried thereby, of the crank-shaft I, provided with oppositely-arranged cranks $a$ $b$, pinions K, carried by the crank-shaft and engaged by the spur-wheels C, the oscillating rods O, having forks P, and provided with crank-boxes N, received on the cranks $a$ $b$, and the spring-pressed bars R, sliding in bearings in the frame and having guides Q pivoted in their rear ends, substantially as described.

CURTIS GATES.

Witnesses:
T. H. DOWNING,
A. A. RAND.